United States Patent [19]

Lundahl et al.

[11] Patent Number: 4,550,554
[45] Date of Patent: Nov. 5, 1985

[54] CROP PROCESSOR

[75] Inventors: E. Cordell Lundahl; James G. Wiser, both of Logan; W. Ray Thornley, Hyde Park; Laurel H. Jensen, Hyrum, all of Utah

[73] Assignee: Ezra C. Lundahl, Inc., Logan, Utah

[21] Appl. No.: 567,661

[22] Filed: Jan. 3, 1984

[51] Int. Cl.[4] ............... A01D 55/20; A01D 49/00
[52] U.S. Cl. .................... 56/294; 56/121.42; 56/364; 56/502; 56/504
[58] Field of Search ............ 56/504, 502, 364, 400, 56/400.21, 294, 156, 167, 314, 192, 121.42, 370

[56] References Cited

U.S. PATENT DOCUMENTS

| | | | |
|---|---|---|---|
| 882,969 | 3/1908 | Rump | 56/167 |
| 1,070,346 | 8/1913 | Kent | 56/502 |
| 2,000,249 | 5/1935 | Pew | 56/294 |
| 2,550,976 | 5/1951 | Cushman | 56/400 |
| 2,631,418 | 3/1953 | Ronning | 56/502 |
| 2,634,567 | 4/1953 | Huitema | 56/294 |
| 2,663,985 | 12/1953 | Hinson | 56/504 |
| 2,783,606 | 3/1957 | Wilson | 56/364 |
| 2,835,097 | 5/1958 | Sullivan | 56/314 |
| 2,836,023 | 5/1958 | Caldwell | 56/294 |
| 2,990,667 | 7/1961 | Schwalm | 56/294 |
| 3,029,583 | 4/1962 | Patt | 56/249 |
| 3,054,247 | 9/1962 | Roesler | 56/294 |
| 3,073,100 | 1/1963 | Kingsley | 56/294 |
| 3,122,871 | 3/1964 | Frevik et al. | 56/294 |
| 3,125,845 | 3/1964 | Lee | 56/364 |
| 3,157,014 | 11/1964 | Bottenberg | 56/6 |
| 3,205,643 | 9/1965 | Dunham | 56/314 |
| 3,221,484 | 12/1965 | van der Lely | 56/192 |
| 3,233,395 | 2/1966 | Dahl et al. | 56/192 |
| 3,479,805 | 11/1969 | Soteropulos | 56/192 |
| 3,501,901 | 3/1970 | van der Lely | 56/13.6 |
| 3,678,669 | 7/1972 | Czajkowski | 56/364 |
| 3,862,539 | 1/1975 | Stevens | 56/294 |
| 4,141,201 | 2/1979 | Christensen | 56/121.42 |
| 4,148,175 | 4/1979 | Miller | 56/14.5 |
| 4,182,103 | 1/1980 | McNutt | 56/364 |
| 4,185,445 | 1/1980 | van der Lely | 56/14.5 |
| 4,188,738 | 2/1980 | Vohl | 56/294 |
| 4,189,907 | 2/1980 | Froman | 56/400 |

Primary Examiner—Paul J. Hirsch
Attorney, Agent, or Firm—B. Deon Criddle

[57] ABSTRACT

An auger cutter, windrower, and conditioner for standing crops such as hay, including a cutting auger with cutting teeth on the peripheral edge of the auger flight and a conveyor auger to move cut crop to a central area to be discharged as a double windrow.

6 Claims, 8 Drawing Figures

CROP PROCESSOR

BRIEF DESCRIPTION OF THE INVENTION

1. Field of the Invention

This invention relates to apparatus for processing crops and particularly for cutting, conditioning and windrowing standing crops, such as hay, corn and the like.

2. Prior Art

The desirability of an auger cutter to cut standing crops has been previously recognized. Such cutters are efficient and generally provide faster cutting operation than is possible with other known cutters. U.S. Pat. No. 3,073,100, for example, discloses a known cutter having a helical cutting flange fixed around a journalled shaft. A flat cutting blade projects from the peripheral edges of the helical flange and may be provided with serrations.

U.S. Pat. No. 3,862,539 also shows a device having helical blades for use in ground clearing operations. The device is powered by a tractor and the blades and cutting elements are designed for use in clearing heavy debris such as stumps and small trees and to perform ground levelling functions. Cutting elements are attached to and project from the peripheral edge of the blades. The cutting elements are spaced along the blades, and as the blades rotate the cutting elements thereon move between cutting elements on a supporting framework so that debris carried between them is pulverized.

In the cutting and conditioning of standing crops it is desirable that the crop be cut and processed for conditioning without damaging the crop by pulverizing it or by stripping leaves from the cut stems.

It has been recognized that an auger cutter can be used in the cutting of standing forage crops, such as hay, not only to accomplish cutting of the crop but also to condition the crop for rapid drying, without excessive foliage loss, and to place the crop in windows for drying and further handling.

SUMMARY OF THE INVENTION

Objects of the Invention

Principal objects of the invention are to provide an auger cutter, windrower and conditioner that will cut a standing crop, condition the crop as it is cut to speed the drying process without loss of the nutrient value and that will place the cut and conditioned crop in windrows for drying and further handling.

Other objects are to provide an auger cutter readily adaptable to being pushed or pulled by a farm vehicle prime mover such as a tractor and, that if pulled behind the prime mover, will effectively process crop that has passed beneath the wheels of the prime mover.

Still another object is to provide an auger cutter that will discharge cut crop into one or more windows having a central opening extending longitudinally thereof to provide more effective drying of the crop.

Features of the Invention

Principal features of the invention include a cutter assembly having an auger cutter with a central tubular shaft and auger flights extending therearound. The auger flights are formed from a flange that is helically wound around the central shaft, and the direction of rotation of the helix is reversed at the selected point of discharge of a cut crop through a bottom opening and/or a rear discharge opening into a window. Cutting teeth are formed on an inside surface of the peripheral outer edge of the helical flights to cut the standing crop at the base of the stalks. The teeth are cut into the helical flight and at their outermost ends project inwardly with respect to the helical flight.

A conveying auger is positioned to receive crop cut and conditioned by the cutting auger, and to convey the crop to a central discharge location, for discharge into a windrow through variably sized rear discharge openings. The conveying auger is provided with smooth surfaced flights formed from a helically wound flange, and the flights of the conveying auger are provided with a greater spacing along a central shaft than are the flights of the cutter auger. The helical flanges of the conveying auger terminate as paddles or flanges extending parallel to the shaft axis to discharge the crop from the conveying auger.

A support frame carries the cutter auger, the conveyor auger, the drive structure for each auger, a forward cover that engages the crop at a preset height to properly angle the crop into the cutter, a top cover that cooperates with the conveyor auger to move the cut crop centrally to discharge openings through rear covers and aligned with the paddles on the conveying auger, and a ground engaging roller that provides for travel of the unit over the ground.

In one embodiment of the invention the support frame also carries rotating pickup wheels arranged to be aligned between the wheels of a prime mover and the cutting auger. The pickup wheels have projecting, tapered flexible fingers with rings formed therearound to grasp stalks over which the wheels of the prime mover have passed and to raise the stalks for cutting by the cutting auger. Additional objects and features of the invention will become apparent from the following detailed description, drawing and claims.

THE DRAWING

In the drawings:

FIG. 1, is a rear elevation view of the auger cutter, windrower and conditioner of the invention, shown being pulled by a prime mover;

FIG. 2, a top plan view of the invention as shown in FIG. 1;

FIG. 3, a section view taken on the line 3—3 of FIG. 1;

FIG. 4, an end elevation view of the auger cutter, windrower and conditioner of the invention taken from the right of the unit as shown in FIG. 1;

FIG. 5, a section view taken on the line 5—5 of FIG. 4 and showing the guide plate and the rear discharge openings;

FIG. 6, an enlarged view of the cutting auger taken within the line 6—6 of FIG. 5, and showing the cutting teeth on the cutting auger;

FIG. 7, a still more greatly enlarged section view, taken on the line 7—7 of FIG. 6; and FIG. 8, a similar view taken on the line 8—8 of FIG. 6.

DETAILED DESCRIPTION

Figure 1:
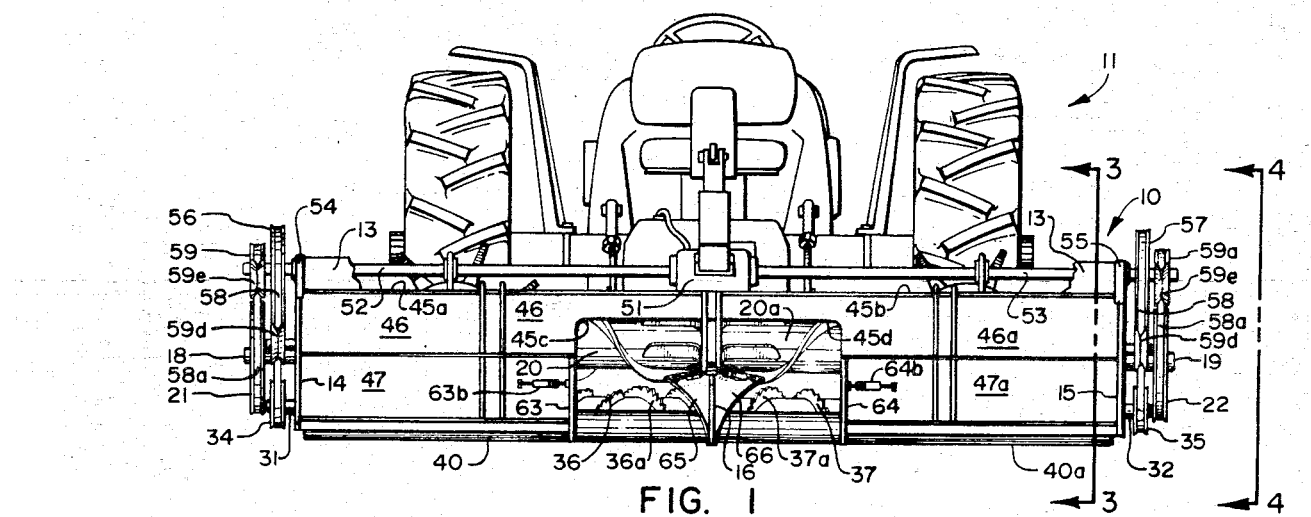
Figure 2:
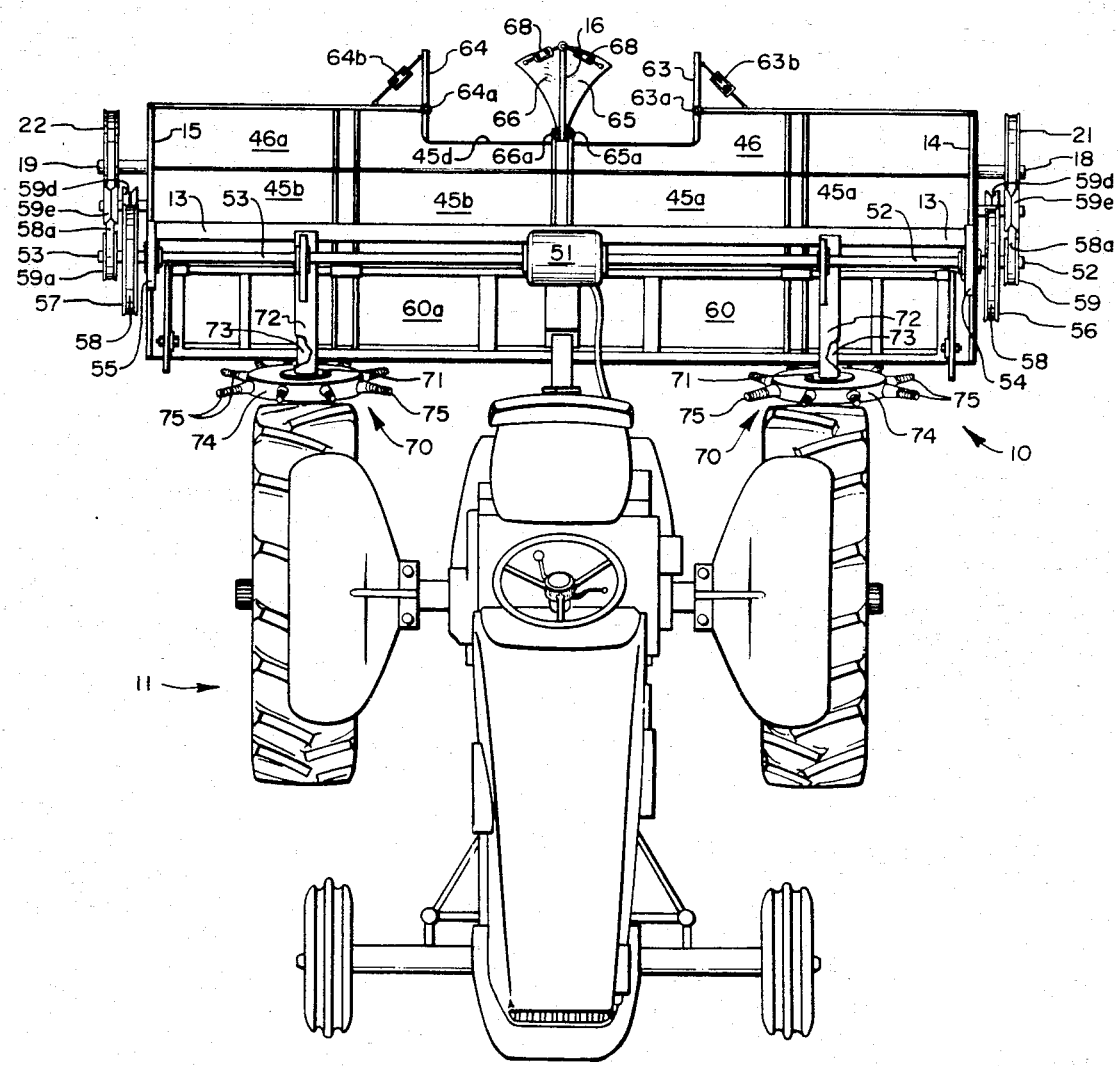

Referring now to the drawings:

In the illustrated preferred embodiment, the auger cutter, windrower and conditioner unit of the invention is shown generally at 10, being powered by a prime mover, shown in FIGS. 1 and 2 as a tractor 11. It will be apparent that while the unit 10 is illustrated as being towed behind the prime mover, it could as well be mounted forward of the prime mover so as to be pushed or mounted to either side of the vehicle to provide a side cutting action.

Figure 3:
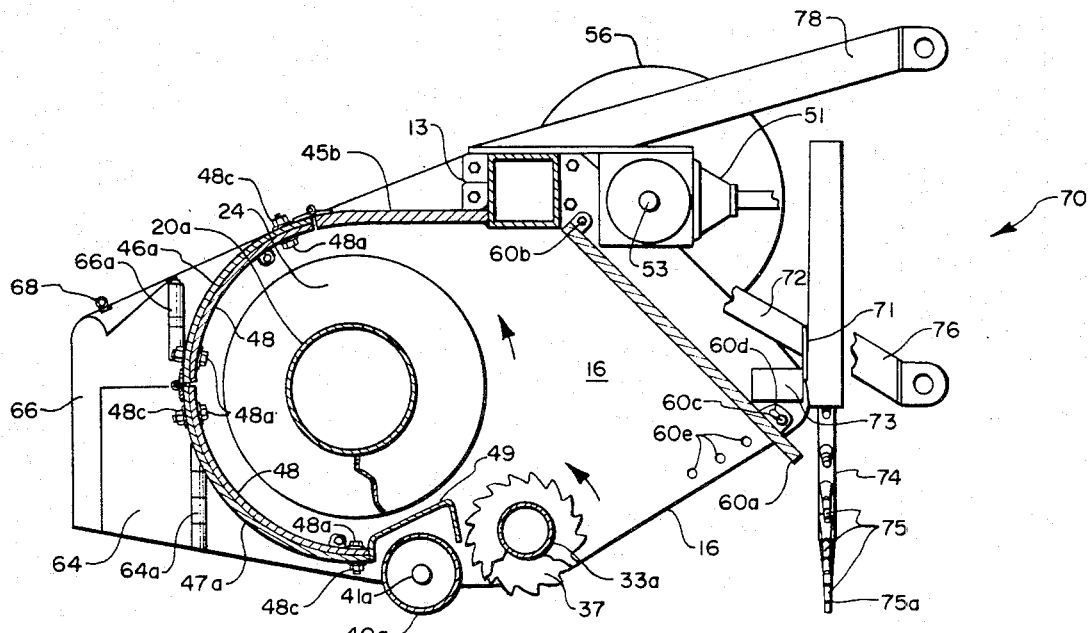
Figure 4:
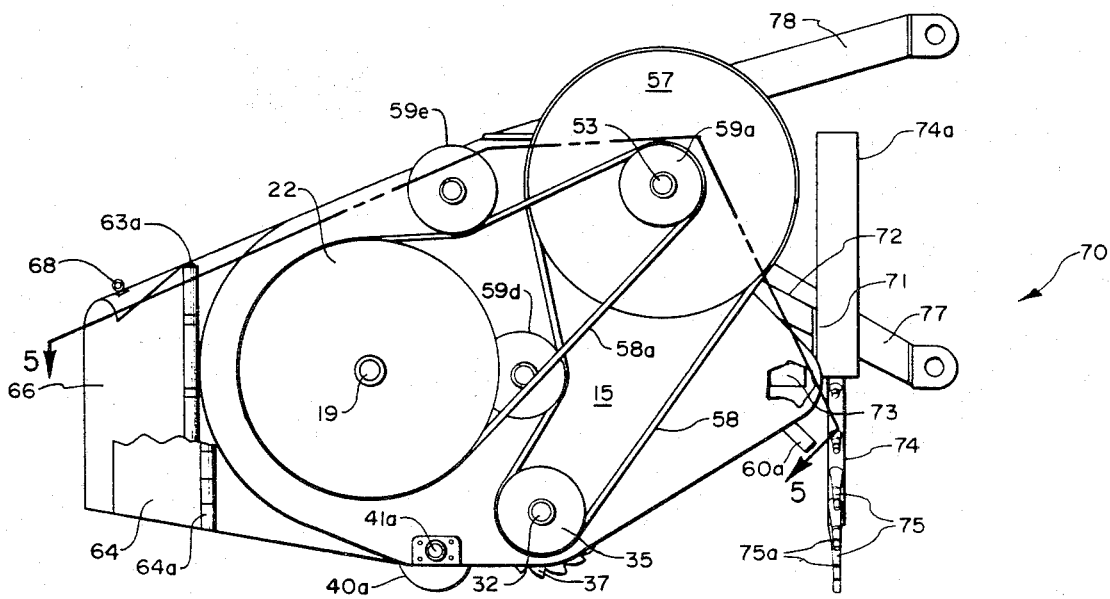
Figure 5:
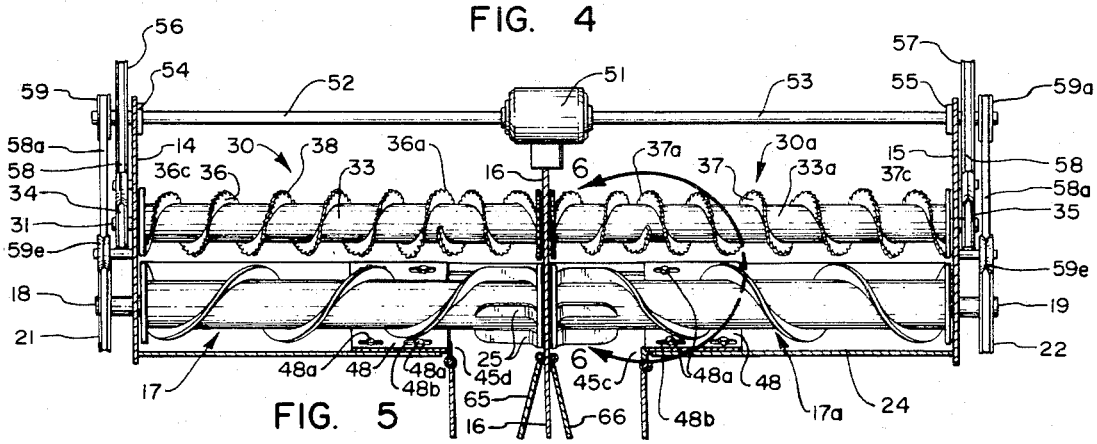
Figure 6:
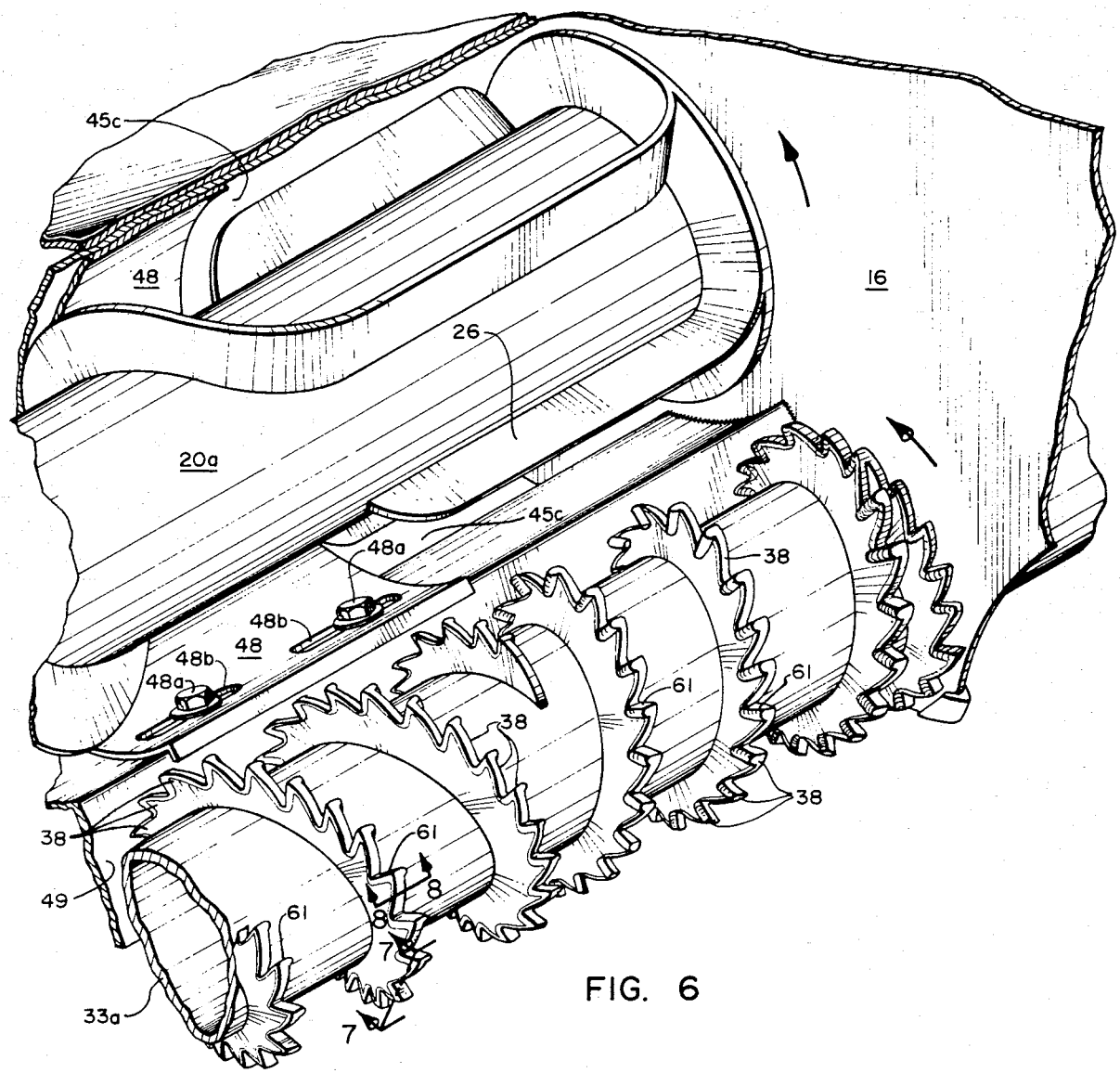
Figure 8:
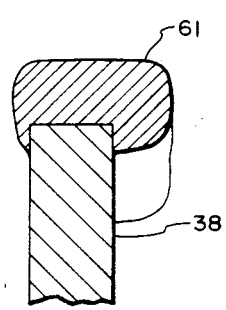
Figure 7:
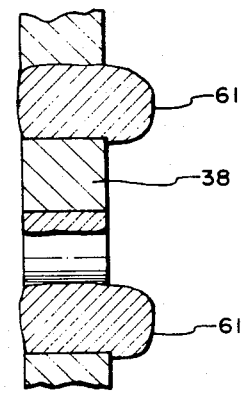

The auger cutter, windrower and conditioner unit 10 includes a support frame 12, shown best in FIGS. 3 and 5, comprising a top rail 13 formed from a rectangular tube and having end plates 14 and 15 and a center plate 16 cantilevered therefrom.

A pair of conveyor augers shown generally at 17 and 17a in FIG. 5, respectively, extend between and are journalled at the end plates 14 and 15 and at the center plate 16. Stub shafts 18 and 19 respectively, project from the conveyor auger shafts 20 and 20a, which shafts preferably are formed from tubular members, and are journalled through the end plates to have pulleys 21 and 22, respectively, affixed thereon.

A helical flange 23 is provided around the length of the conveyor auger shaft 20 at one side of center plate 16, and another helical flange 24 is provided around the length of the conveyor auger shaft 20a and at the other side of the center plate 16. Each of the flanges 23 and 24 are, respectively, turned around their shafts 20 and 20a so as to convey material engaged by the flanges toward the center plate 16. Thus, the flanges 23 and 24 are oppositely wound.

Flange 23 terminates at one of a series of paddles 25 spaced around shaft 20, adjacent to the center plate 16, and flange 24 simularly terminates at one of a series of paddles 26 spaced around shaft 20a, also adjacent to the center plate 16. As will be further explained, the paddles 25 and 26, each of which extend along and project from the shafts 20 and 20a and parallel to the axis of these shafts, will assist in discharging cut material from the unit 10.

A pair of cutting augers shown generally at 30 and 30a in FIG. 5 also extend between end plates 14 and 15 are journalled at the end plates and at the center plate 16. Stub shafts 31 and 32, respectively projecting from the ends of cutting auger shafts 33 and 33a, which may also be made of tubular material, are, respectively, journalled through the end plates 14 and 15 and have pulleys 34 and 35 thereon.

Oppositely turned principal helical flanges 36 and 37 are respectively provided around the cutting auger shafts 33 and 33a at opposite sides of the center plate 16. Reversely turned flanges 36a and 37a, are provided around shafts 33 and 33a at their ends adjacent to the center 16 to better cut and discharge crop, as will be further explained. The reversely turned flanges 36a and 37a are turned out of flange plates 36b and 37b that turn with the cutting auger shafts adjacent to the center plate 16. Similarly, the principal helical flanges 36 and 37 are turned out of flange plates 36c and 37c that are respectively adjacent to the end plates 14 and 15. The cutting augers 30 and 30a are positioned to have their central axes parallel to the central axes of the conveying augers 17 and 17a and are spaced therefrom so that a slight clearance is provided between the helical flanges of the two sets of augers.

The principal flanges of the cutting and conveying augers on the same sides of the center plate 16 are turned in the same direction about their auger axes. Thus, the flange 36 of the cutting auger 30 is turned about the axis of the cutting auger 30 in the same direction as the flange 23 is turned around the axis of the conveyor auger 17. Flange 37 of the cutting auger 30a is turned about the axis of the cutting auger 30a in the same direction as the flange 24 is turned about the axis of the conveyor auger 17a. Teeth 38, to be further described, are spaced along and project from the peripheral edges of the flanges 36, 37, 36a and 37a and from the peripheral edges of the flange plates 36b and 37b.

The cutting augers are positioned to be beneath and forward of the conveyor augers during travel of the unit 10 in the cutting, windrowing and conditioning of standing crops.

A pair of ground engaging rollers 40 and 40a may have their axes 41 and 41a journalled in bearings on the end plates 14 and 15 and on the center plate 16. The outer surface of the rollers 40 and 40a will then extend below the other structure of the unit 10 and slightly below the outer edges of flanges 36, 37, 36a, and 37a and flange plates 36b, 37b, 36c and 37c to support the unit 10 as it travels over the ground. Rollers 40 and 40a are positioned rearwardly of the cutter auger and below the conveyor auger and, as will be apparent, standing crop is cut ahead of the rollers and is discharged from unit 10 over the rollers and into the conveyor augers.

Top covers 45a and 45b, welded or otherwise affixed to rail 13, and the plates 14, 15 and 16, extend over the top of the conveying augers and the rollers.

Upper rear guide housing plates 46 and 46a extend between and are removably bolted to the end plates 14 and 15 and center plate 16, and each curves from a top cover to a point to the rear of the conveying augers 17 and 17a. Lower rear housing covers 47 and 47a then extend downwardly from the covers 46 and 46a and between the end plates 14 and 15 and center openings 45c and 45d.

The openings 45c and 45d are provided in the lower part of upper housing plates 46 and 46a at the center thereof and between the plates 47 and 47a and center plate 16. Slide plates 48, bolted to opposite sides of the openings, are mounted by bolts 48a passed through slots 48b and roller cover plates 49 and by nuts 48c to set a desired opening size. As will be further explained, the slide plates are separated and secured by the nuts and bolts but are moved together or apart to provide a desired size for openings 45c and 45d. It will be apparent that cut crop, moved centrally by the conveying augers 17 and 17a will be discharged through the openings 45c and 45d and will fall behind the rollers 40 and 40a.

Cover plates 49 extend from the lower front edges of plates 47 and 47a and between the end plates 14 and 15 and center plate 16 over the rollers 40 and 40a and between the rollers and the cutting augers. The cover plates, thus, provide guides over the rollers for material cut by the cutting augers not directly picked up by the conveyor auger and into position to be picked up by the conveyor augers.

A gear box 51, carried by rail 13, is driven in conventional fashion by a power takeoff of the prime mover or other drive means. The gearbox is positioned above top covers 60 and 60a and has drive shafts 52 and 53 extending therefrom and journalled through brackets 54 and 55 carried by the end plates 14 and 15, respectively. Pulleys 56 and 57 on the ends of the shafts 52 and 53, respectively, are interconnected by drive belts 58 to the pulleys 34 and 35 so that operation of gearbox 51 will turn drive shafts 52 and 53, pulleys 56 and 57, belts 58, and pulleys 34 and 35. Pulleys 59 and 59a, also on respective shafts 52 and 53 are connected by belts 58a to pulleys 21 and 22, respectively, that are connected to the stub shafts 18 and 19. Idler pulleys 59d and 59e may be used to maintain belts 58 and 58a taut.

The relative peripheral speeds of rotation of the conveyor augers 17 and 17a and cutting augers 30 and 30a are, thus, determined by the relative sizes of the driving and driven pulley and by the relative diameters of the augers. It has been found that the best cutting, windrowing and conditioning is achieved by providing a conveyor auger having a larger overall circumference than does the cutting auger and by rotating the cutting auger at a faster speed than the conveyor auger is rotated.

A pair of front covers 60 and 60a extend across and are pivotally connected at 60b between the end plates 14 and 15 and the center plate 16. The front covers 60 and 60a provide surfaces that are adjustably sloped upwardly towards rail 13 from a location just above the ground at the front of the unit 10 during its use. Pins 60c are inserted through holes 60d in the front covers and selected hole 60e in the side plates 14 and 15 and center plate 16 to hold the front covers in their desired augular relationships. As the front covers engage and pass over standing crop to be cut the sloping surfaces thereof bend the stalks of the crop downwardly such that the cutting auger then receives the stalks in a bent condition.

The teeth 38 on flanges 36 and 37, 36a and 37a of cutting augers 30 and 30a, respectively, on the peripheral edges of flange plates 36b and 37b are cut into the outer peripheral edges of each of the flanges and flange plates and are formed to have faces extending inwardly with respect to the direction of travel of crop cut by such flanges, i.e., toward the center plate 16, in the case of flanges 36 and 37 and flange plates 36c and 37c and away from the center plate 16 in the case of flanges 36a and 37a and flange plates 36b and 37b. Each tooth 38 on a flange has a cutting edge 61 that becomes a leading edge during turning of the cutting auger, and the teeth are closely spaced along the edges of the flanges.

As a tooth 38 on a flange reaches its lowermost location, the face 61b thereof, which is then positioned substantially normal to the ground, engages the lowermost portion of bent stalks of the crop to cut the stalks, which are also bent at the same time by engagement of the peripheral edge of the flange into which the tooth is formed. The continued rotation of the cutting auger then moves the cut stalk inwardly towards an area adjacent to the center plate 16 and upwardly into the conveyor auger flanges. The teeth 38 on the flange plates cut stalks close to the end and center walls, and as the cut stalks fall they are picked up by the flanges of the cutting augers to be moved the same direction as shown by the directional arrows, with cut material flowing over the top of the auger cutter and into the conveyor auger. It is then moved over the top of the conveyor auger and to the openings 45c and 45d to form a windrow.

Upright outer plates 63 and 64, pivotally connected at 63a and 64a, respectively, at opposite sides of opening 45c, and controlled by turnbuckles 63b and 64b, extend rearwardly from the rear plates to retain the discharged crop and to insure its falling into the desired windrow pattern. Also, a pair of diverging center guide plates 65 and 66 may be provided between the openings 45c and 45d to direct cut crop to opposite sides thereof. This splits the windrow to give better aeration during drying of the crop. The amount of divergence between plates 65 and 66 is preferably controlled by pivotally mounting the plates at 65a and 66a, respectively, to the rear plates and providing adjustable turnbuckles 68 between the plates and the center plate 16. The plates 65 and 66 may have curved tops to prevent crop being discharged thereover.

When the auger cutter, windrower and conditioner unit 10 is pulled behind a prime mover 11, as shown, the wheels of the prime mover will pass over standing crop and will bend the crop to the ground. To insure cutting and processing of that crop knocked down by the wheels, crop retrieval units 70 are provided.

Each crop retrieval unit comprises a support plate 71 carried by an arm 72 that is attached to rail 13 and with the support plate being positioned behind a rear wheel of the prime mover. A hydraulic motor 73 is fixed to each support plate, and the motor is connected through the support plate to a rotating circular plate 74. Each hydraulic motor 73 is powered through flexible lines connected in conventional fashion to the hydraulic system of the prime mover. Flexible fingers 75 are spaced around and radiate from a circular plate 74, and as the plate 74 is rotated the fingers engage and sweep across the ground behind the wheel of the prime mover to pick up crop knocked down by the wheel. The fingers 75 are preferably tapered to provide increased flexibility at their distal ends and have encircling grooves 75a at the distal ends to better engage and pick up crop. The crop picked up by the crop retrieval units is then ready to be engaged by the front covers 60 and 60a or the auger cutters as previously described.

A top arm 78, mounted to the center of top rail 13 and two side arms 76 and 77 connected to top rail 13 provide a three-point hitch for attachment to a lift unit of the prime mover, whereby the unit 10 can be raised during road travel, and the like, and can be lowered to ground engagement during crop processing.

In operation of the auger cutter, windrower and conditioner of the invention, the unit 10 is pushed or pulled over a crop, such as hay or corn, to be cut. As the unit passes over the crop the front covers 60 and 60a bend the stalks of the crop such that the teeth 38 on the turning cutting augers will engage and cut the bottoms of the stalks. The cutting augers are then turning such that the cutting edge of the teeth on the helical flights of the cutting augers then cut the bottom of the stalk with an essentially upward and forward cut. The inwardly projecting teeth continue to engage the cut stalk and to carry it over the cutting auger before it is discharged. As the stalks are raised by the cutting auger they are picked up by the conveying augers to move the crop inside the top and rear covers. As the crop is moved by the cutting augers it is conditioned and the amount of conditioning desired (which may vary from crop to crop or cutting to cutting) is controlled by the size and type of cutting teeth and speed of auger rotation.

With crops such as hay, having relatively short stalks, the cut crop is moved within the guide housing 46 and 46a by the flight of the conveying auger. The cut crop is then discharged through openings 45c and 45d in the manner previously described. With such crops, the front covers 60 and 60a are positioned to have their leading edges relatively close to the ground to properly bend the stalks for engagement by the teeth on the cutting augers.

With crops such as corn, having longer stalks (longer than stalks cut for hay, for example) the top and rear covers are preferably removed and the conveyor auger cooperates with the top housings to move the stalks for discharge to the central rear of the unit.

Crop discharged from openings 45c and 45d is formed into a double windrow of preset width so that the rapid drying of the crop will occur.

The width and shape of the double windrow are determined by the augular placement of the outer plates 63 and 64. The outer plates that are pivotally connected to the rear plates 48 by pivot connections 63a and 64a. The augular relationships between the top covers and the outer plates are then set using turnbuckles 63b and 64b respectively connected between plate 63 and rear plates 48 and plate 64. The shape, width and central spacing of the double windrow is thus controlled by turnbuckles 63b, 64b, 68 and 69 and can be set by the user while considering such factors as the type crop being cut, the density of the crop, the moisture content of the crop and existing weather conditions to provide an optimum windrow.

Although a preferred form of our invention has been herein disclosed, it is to be understood that the present disclosure is by way of example and that variations are possible without departing from the subject matter coming within the scope of the following claims, which subject matter we regard as our invention.

We claim:

1. A crop processor comprising
   a support frame adapted to be coupled to a prime mover;
   at least one elongate cutting auger journalled by said support frame and including a central shaft having a helical flange extending therearound;
   cutting teeth spaced along and cut into the outer peripheral edge of the helical flange and with the outermost edge of each tooth extending from the flange in the direction of travel of the crop cut by the teeth and carried by the helical flange;
   means for rotating the cutting auger about its longitudinal axis;
   roller means on the frame for traveling the frame over the ground;
   means to hold the cutting auger a selected distance off the ground and with its longitudinal axis substantially normal to the direction of travel of the frame;
   cover means to direct crop cut by the cutting auger to a rear discharge location and to bend crop to have stalks thereof cut by the cutting auger;
   a towbar connected to and projecting from the frame to connect to the drawbar of a towing prime mover;
   crop pick up by means carried by the frame and positioned to be between each cutting auger and wheels of the prime mover, said crop pick up means including
   support shafts fixed to the frame, and a wheel carried by each support shaft,
   flexible fingers radiating from the periphery of each wheel to engage the ground during rotation of such wheel, and
   means carried by the frame to rotate the wheel whereby the fingers sweep the ground in a plane traverse to direction of travel of the prime mover and raise crop knocked down by the wheels to be bent by the housing.

2. A crop processor as in claim 1, wherein the flexible fingers are tapered and have parallel grooves formed therearound.

3. A crop processor comprising
   a support frame adapted to be coupled to a prime mover;
   at least one conveyor auger carried by said support frame and including a helical flange therearound;
   at least one cutting auger carried by said support frame and forming an auger pair with a said conveyor auger and including a helical flange therearound with cutting teeth on the peripheral edge thereof, said cutting auger being forward and below the conveyor auger of the auger pair and extending parallel to said conveyor auger and with the helical flanges of the augers of said auger pair being closely spaced with respect to one another;
   rear cover means carried by the support frame and extending over the conveying auger and the cutting auger of the auger pair to direct crop material cut by the said cutting auger of the auger pair and moved by said conveyor auger of the auger pair to a rear discharge location and to bend crop to have stalks thereof cut by the cutting auger;
   a towbar connected to and projecting from the frame to connect to the drawbar of a towing prime mover
   crop pick up means carried by the frame and positioned to be between each cutting auger and wheels of the prime mover, said crop pick up means including a support shaft fixed to the frame;
   a wheel carried by the supporting shaft;
   flexible fingers radiating from the periphery of the wheel; and
   means carried by the frame to rotate the wheel.

4. A crop processor as in claim 3, wherein the flexible fingers are tapered and have parallel grooves formed therearound.

5. A crop processor as in claim 3 wherein
   the means to drive the conveyor auger and the cutting auger drives said augers in the same direction of rotation.

6. A crop processor comprising
   a support frame adapted to be coupled to a prime mover;
   at least two conveyor augers on a common axis carried by said support frame and each including a helical flange therearound;
   at least two cutting augers on a common axis carried by said support frame and each forming an auger pair with a said conveyor auger and including a helical flange therearound with cutting teeth on the peripheral edge thereof, said cutting auger being forward and below the conveyor auger of the auger pair and extending parallel to said conveyor auger and the conveyor auger and cutting auger flanges of each pair being closely spaced with respect to one another and turned in the same direction to convey material to a central discharge area, and a reverselyturned flange forming a continuation of the helical flange on each cutting auger at said discharge area, and paddles radiating from each conveyor auger adjacent to the discharge area;
   rear cover means carried by the support frame and extending over the conveying auger and the cutting auger of the auger pair of direct crop material cut by the said cutting auger of the auger pair and moved by said conveyor auger of the auger pair to the said discharge area, said cover means having a centrally located discharge opening therethrough adjacent to the said discharge area whereby the flanges on the augers will feed crop cut by the cutting auger towards the center thereof and through the discharge opening.

* * * * *